United States Patent

Pogrzeba et al.

[11] 4,247,273
[45] Jan. 27, 1981

[54] METHOD AND AN APPARATUS FOR CAMBERING THE EDGES OF WEBS OF THERMOPLASTIC MATERIALS ON ONE AND BOTH SIDES USING THE ENERGY OF ULTRASONIC VIBRATION

[75] Inventors: Gerhard Pogrzeba, Langenfeld; Julius Geiger, Odenthal; Alfred Neworal, Leverkusen; Heinrich Bussmann, Cologne; Roland Hourticolon, Leichlingen; Rudolf Hannappel; Heinz Auweiler, both of Leverkusen, all of Fed. Rep. of Germany

[73] Assignee: AGFA-Gevaert, A.G., Leverkusen, Fed. Rep. of Germany

[21] Appl. No.: 60,826

[22] Filed: Jul. 25, 1979

[30] Foreign Application Priority Data

Jul. 27, 1978 [DE] Fed. Rep. of Germany ....... 2832891

[51] Int. Cl.³ .......................... B29C 3/00; B29F 5/00; B29C 15/00
[52] U.S. Cl. .............................. 425/174.2; 425/174.4; 264/23
[58] Field of Search ........................... 425/174.2, 174.4

[56] References Cited

U.S. PATENT DOCUMENTS

| 3,160,687 | 12/1964 | Andrews | 425/174.4 |
| 3,539,344 | 11/1970 | Russell | 96/67 |
| 3,635,609 | 1/1972 | Balamuth | 425/174.2 |
| 3,689,346 | 9/1972 | Rowland | 425/174.4 |
| 3,749,006 | 7/1973 | Loose | 101/3 R |
| 3,771,939 | 11/1973 | Barth | 425/174.2 |
| 3,890,892 | 6/1975 | Loose et al. | 101/32 |

FOREIGN PATENT DOCUMENTS

| 2045452 | 4/1971 | Fed. Rep. of Germany . |
| 2154129 | 7/1972 | Fed. Rep. of Germany . |
| 2247442 | 4/1974 | Fed. Rep. of Germany . |
| 2423208 | 12/1974 | Fed. Rep. of Germany . |
| 2344679 | 3/1975 | Fed. Rep. of Germany . |
| 1571647 | 5/1969 | France . |
| 1459769 | 12/1976 | United Kingdom . |
| 1484081 | 8/1977 | United Kingdom . |

*Primary Examiner*—Maurice J. Welsh
*Attorney, Agent, or Firm*—Connolly and Hutz

[57] ABSTRACT

The invention relates to an apparatus and a method for cambering the edge of webs of thermoplastic materials on one or both sides wherein the edges of the web are continuously guided through stamping units and the edges are provided with stampings. The thermoplastic cambering is made by utilizing the energy of ultrasonic vibration. The stamping unit consists of a stamping wheel with pressure apparatus for the wheel and a stationary ultrasonic head arranged beneath it with a sonotrode. A calibration apparatus can be arranged downstream of the stamping unit.

7 Claims, 6 Drawing Figures

METHOD AND AN APPARATUS FOR CAMBERING THE EDGES OF WEBS OF THERMOPLASTIC MATERIALS ON ONE AND BOTH SIDES USING THE ENERGY OF ULTRASONIC VIBRATION

The present invention relates to a method and apparatus for cambering the edges of webs of thermoplastic materials on one or both sides. When webs which are coated with light-sensitive emulsions are wound up, pressure exposures occur as the result of the winding tension. In addition, the risk arises with each wound web that the layers of windings might shift or shoot out axially relative to each other during transportation.

The problems mentioned above are generally solved by thickening the edges of the web. The pressure between the layers of the roll produced by the winding tension are taken up by the thickened edge section of the web, and pressure exposures in layers of photographic pressure-sensitive emulsions or transfer of the cast layers such as the dye layer, the emulsion layer, rear layer and of the printed image or a printed surface from one surface to the other side of the next layer of the web during storage are thus avoided.

Many methods of solving this important problem are known. For example, the edges can be thickened by allowing strips of paper or sheeting to run loosely on the edges of the web or by applying small beads to the edges according to French Pat. No. 1,571,647, thereby causing the edges to take up the layer pressure between the windings.

Cold stamping methods are better for shaping the edges of the web as they save more material. In cold stamping methods, the edge of the web is pressed against tips of a stamping wheel which bears by means of an elastic counter wheel. The material thus displaced causes the edge to thicken, as described, for example, in German Offenlegungsschrift No. 2,247,442. These cold stamping, cold corrugating or cold knurling methods are disadvantageous in that the shaping achieved disappears in the wound state after a short time under the influence of pressure so that pressure exposures or transfer phenomena can occur even after the first winding procedure, or the windings of the web can shift or shoot out during transportation. This damages the edges of the web and there is therefore a risk of the web tearing or rending in the subsequent processing machines. The web also becomes subject to corrugation or a "winged" effect along the edges. It is therefore only possible to wind the webs into small diameter rolls by these methods. The problem cannot be solved either by following cold stamping by a thermal treatment of the stamping at the edge of the webs in accordance with German Offenlegungsschrift No. 2,344,679.

The thermal stamping method described in German Offenlegungsschrift No. 2,423,208 provides an improvement. In this thermal stamping or knurling method, one or more heated stamped wheels are pressed on to the edges of the web. The stamping tips penetrating the web shape the material thermoplastically so as to form beads around the tips, which lead to cambering of the edges. This thermoplastic shaping disappears in part under the action of pressure, and this phenomenon increases in proportion to the winding tension and the diameter of the roll. The stamping has to be higher toward the production end than the thickness of the layers so that it can fulfill its purpose, that is to say provide protection from pressure exposure and prevent the roll from shooting out. The high temperature needed for this purpose and the high pressures cause the edge of the web to shift ("wing" effect) owing to the softening of the area surrounding the stamping.

The "wing" effect increases in proportion to the depth of the stamping and, above a certain thickness, leads to difficulties, so the depth of the stamping is limited. For this reason, it is only possible to wind the web to a relatively small roll diameter and it is not possible to achieve the efficiency which comes with large roll diameters.

It is also known that, owing to their internal structure, plastics this way shaped tend to re-assume their original shape, and consequently both hot and cold stampings disappear of their own accord in the course of time.

Methods and apparatuses are described in Patent Applications German Offenlegungsschriften Nos. 2,045,452 and 2,154,129 for stamping symbols which do not disappear, such as number or letters, in sheeting with the aid of ultrasonics, or stamping through the material in such a way that these symbols can be read even in darkness. The stamping tools for a symbol are divided into a plurality of individual projections extending from the surface of the stamping tool so as to make it possible to stamp symbols of large area. These apparatuses are not suitable for stamping edges.

The object of the invention is to produce on a web, in one operation, a sufficiently high cambering of the edges, which corresponds to the thicknesses of the layers cast on to the strip, remains stable in shape, does not produce a "winged" effect and effectively prevents individual windings of the web from shooting out and to avoid pressure exposures in layers of photographic pressure sensitive emulsions if used.

The object has been achieved according to the invention in that the thermoplastic cambering of the edges of the web is made by utilizing the energy of ultrasonic vibration.

When the energy of ultrasonic vibration was used in a stamping method for cambering the edges, it was surprisingly found that no "winged" effect occurred even in the case of extremely large cambers. This fact allowed a substantially finer division of the stamping wheel pattern than in the case of thermal stamping, thus leading to a substantially larger working volume and thus to greater stability in shape. It was also possible to achieve a larger working volume with stable cambering at the end by means of deeper stamping and subsequent calibration (flat bed printing between two rollers) and this leads to even greater stability in shape.

In addition, the ultrasonic stamping method surprisingly provides the possibility, which could not be anticipated by the skilled man, of thickening the edges on both sides in one operation by using a suitable configuration of the tools, thus considerably reducing the risk of the web shooting out since the edges of the web hook into each other under pressure.

The essential advantages of this apparatus and of the method according to the invention lie in the fact that the tool at the ultrasonic head (the sonotrode) does not heat up sufficiently for the area surrounding the stamping or knurling points to become hot. Indentations are melted into the edges of the web by the concentrated energy at the points of contact between the sonotrode and the web under the counter-pressure of the profiled knurling wheel on the opposite side of the web so that the material which is melted away forms a permanent bead around the indentation. No dust is formed, as for example with polyester sheeting which is stamped with heat and thus countersunk, since the ultrasonic energy acts in a much more concentrated manner and does not emit a substantial amount of thermal radiation energy.

The stamping wheel is pressed by means of variably adjustable weights, by air cylinders, springs or in some other suitable manner, on to the edge of the web which is conveyed past continuously and beyond it onto the sonotrode lying beneath it.

In a special embodiment, the sonotrode of the ultrasonic head is provided with grooves and ridges in the direction of travel of the web. Arching is surprisingly formed on both sides of the edges of the web of material. On the stamping wheel side, arching is formed along the ridges toward the stamping wheel while arching is formed toward the sonotrode in the grooves. This arching occurs in a wide variety of forms, depending upon the design of the stamping wheel and the sonotrode.

If the stamping wheel has grooves and ridges encircling its circumference, two archings are formed for each groove between the ridges parallel to the edge of the web and one arching is formed in the grooves of the sonotrode on the opposite side of the length relative to the ridges of the knurling wheel.

If the stamping wheel does not have surrounding grooves, but individual projecting cones or pyramids, indentations are formed at the tips and arching is formed around them on the stamping wheel side as well as cones or pyramids on the sonotrode side of the edge of the web of material. Other combinations of cones, pyramids and encircling ridges and grooves are also possible.

The stamping wheel can be driven by a frictional wheel which on its part is driven by the web in order to prevent slipping between the web and the stamping wheel.

According to a particular embodiment of the invention, the stampings can initially be thicker than desired and then calibrated to the desired thickness by rollers resting on them to further increase their carrying power.

According to the invention, a rotating sonotrode which is flat or profiled on its surface can be used instead of the stationary sonotrode. Thus, arching running transversely or obliquely to the direction of travel of the web in the manner of, say, a tooth, are also feasible. A lot of different shapes and finenesses can be obtained in stamping pattern, depending on the design of the stamping wheel and of the sonotrode.

An embodiment of the invention is described in more detail below with reference to the drawings.

Figure 1:
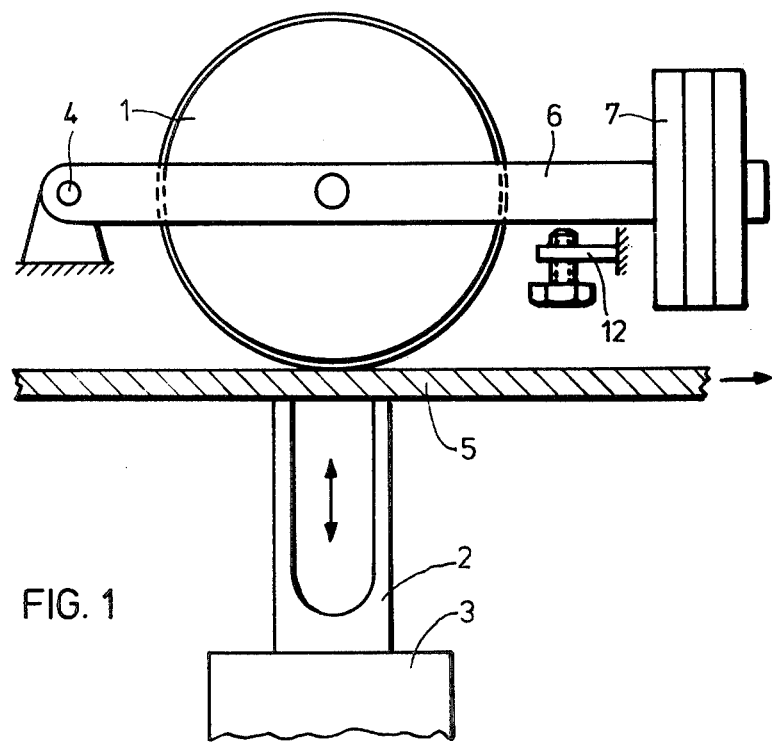
FIG. 1 shows a diagrammatic view of the ultrasonic stamping unit.

The web of thermoplastic material 5 is driven through stamping units arranged on both sides in order to camber its edges. FIG. 1 shows a diagrammatic view of an embodiment. A stamping wheel 1 rests on the web 5, the stamping wheel 1 being rotatably mounted on a lever 6. One end of the lever is pivoted in a bearing point 4 and the other end is loaded with a pressure perpendicularly to the web 5. The pressure for pressing the stamping wheel 1 on to the web is applied in a simple manner in this example by exchangeable and movable weights 7. Similarly, a pneumatically or hydraulically driven piston, a spring or the like could exert the pressure desired for the depth of stamping on the lever. An adjustable end stop 12 limits the downward path of the lever when there is no web of material moving through the apparatus.

An ultrasonic head with a sonotrode 2 is arranged beneath the web 5 and centrally beneath the stamping wheel 1. The energy of vibration of the ultrasonic arrangement 2, 3, which vibrates from the underside against the web 5 and against the stamping wheel 1 resting under pressure and provided with stamping patterns from the top, produces heat which is concentrated locally only on the projecting arching of the stamping wheel and which initiates melting of the thermoplastic web and leaves permanent shapings.

The stamping wheel 1 can also be driven in known manner by a rubber frictional wheel running on the web, when this is necessary to avoid relative movement between the web 5 and the stamping wheel 1.

Figure 2:
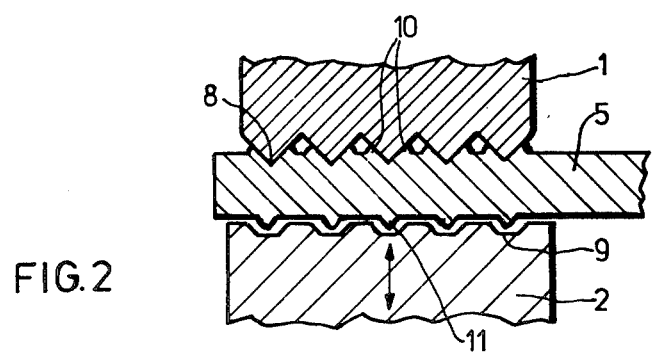
FIG. 2 shows the cooperation of the stamping wheel with the sonotrode.

FIG. 2 shows the cooperation of the stamping wheel 1 and the sonotrode 2. In this exemplary illustration, the stamping wheel 1 is provided with encircling pointed ridges 8 and grooves lying between them. The stamping wheel 1 is loaded with pressure and runs on the edge of the web of sheeting 5, which in turn rests on a sonotrode 2 which is stationary. The thermoplastic material of the web of sheeting 5 melts owing to the sonic vibrations produced by the ultrasonic arrangement 2, 3 and flows on both sides of the ridge 8 into the interposed grooves and here forms arches 10 which continue in the longitudinal direction of travel of the web. For each ridge, the edge of the web has two arches with a groove lying between it. The arches solidify once the stamping wheel and the sonotrode are removed and remain permanently.

If, as illustrated in this case, the sonotrode 2 is provided with grooves 9 which lie beneath the ridges 8 of the stamping wheel 1, then arches 11 are surprisingly formed on the underside of the web beneath each ridge 8, these arches remaining just as stable in shape as the arches 10 on the upper side of the web 5. This ultrasonic stamping method is not restricted to this stamping pattern. The edge stamping can be substantially adapted to the demands imposed, by suitable selection of the number of ridges 8 and of the pressing force of the stamping roller 1 as well as the variation in the ultrasonic frequencies between 20 and 80 KHz and the intensity of the ultrasonic energy.

Figure 3A:
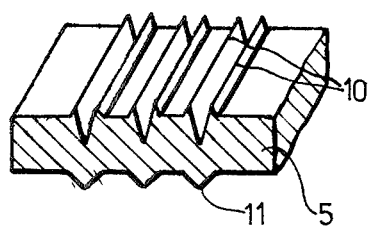
FIG. 3 shows examples of the shaping of the edge by means of a stamping wheel and an sonotrode with
 (a) grooved knurling wheel,
 (b) stamping wheel provided with conical round pins
 (c) stamping wheel provided with rectangular pyramids.
Figure 3A:
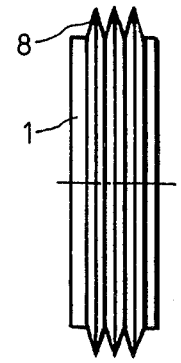
Figure 3B:
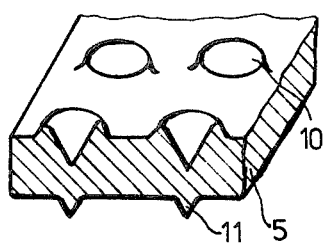
Figure 3B:
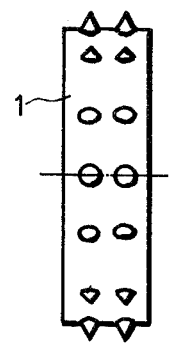
Figure 3C:
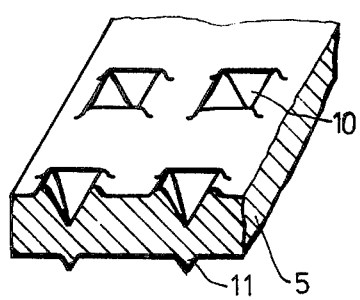
Figure 3C:
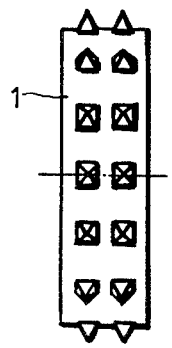

FIGS. 3a to 3c show other variations:

FIG. 3a shows a perspective view of a web edge portion with continuous arches 10 running in the direction of travel of the web, on the upper side of the web and on the underside 11. The stamping wheel has three encircling ridges 8 in this case and produces six arches 10 on the upper side of the web and three arches 11 on the underside. Arches 10, 11 which occur alternately can also be produced by grinding of parts of the grooves 8 on the stamping wheel.

FIG. 3b shows the pattern of a stamping wheel into which conical pins have been inserted. Round craters 10 having a fixed raised rim are thus produced on the upper face of the web while conical elevations 11 are produced on the underside if the sonotrode 2 is recessed. The number can be selected freely and depends upon the number of pins and rows of pins inserted into the stamping wheel.

FIG. 3c shows the stamping pattern forming on the web edge as a result of rectangular pyramids on the stamping wheel 1. Pyramids of this type are easy to produce by grinding away the stamping wheel 1 in such a manner that these pyramids remain.

Figure 4:
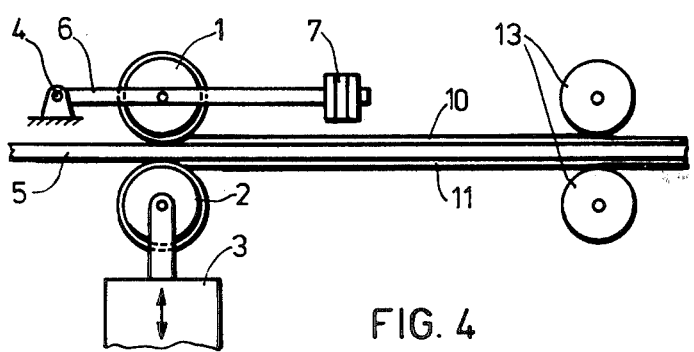
FIG. 4 shows an embodiment with a rotating sonotrode and a subsequent calibration unit.

FIG. 4 shows another embodiment of the invention. A rotating sonotrode 2 with an ultrasonic head 3 is used here instead of the fixed sonotrode in FIG. 1. This sonotrode 2 can also be smooth on its surface or shaped just like the sonotrode described above. The advantage lies in the prevention of sliding friction between the web of thermoplastic material 5 and the sonotrode 2, thus preventing abrasion of the web of material and thus formation of dust. The marked arching of the edges 10, 11 formed by the ultrasonic method is partially compressed again by two calibration rollers 13 in a subsequent apparatus and thus further reinforced so that the remaining arching can take up a considerable winding pressure without disappearing.

The method according to the invention affords considerable advantages over all stamping methods known hitherto since the edge of the web is not additionally shaped with the so-called "winged" effect. The skilled man could not anticipate that it would be possible simultaneously to camber the edge on the upper side and underside of the edge of the web, in one operation, by suitable design of the sonotrode with the ultrasonic stamping method. This cambering of the edge on both sides prevents the web from off-centring or shooting out. Stamping patterns which are suitable for any application can be produced as a result of the numerous possible ways of designing the stamping wheel and the sonotrode. The permanence of the arching produced, which can be improved by subsequent calibration is of particular advantage and even the highest winding pressures can be taken up by the arches on the edge of the web. With this method, it is possible even to wind materials having sensitive surfaces such as, for example, webs having photographic emulsions, into rolls of large diameter, and thus to process them economically.

We claim:

1. An apparatus for thickening and roughening the edges of webs of thermoplastic materials on one or both sides, wherein stamping wheels in stamping units shape the edges of a continuously guided web, characterized in that the stamping unit comprises at least a stationary ultrasonic head with a sonotrode and of a pattern wheel, the pattern wheel being pressed onto the edge of the web and the sonotrode beneath it by force-applying means, and the sonotrode of the ultrasonic head having grooves in the direction of travel of the web, whereby double-sided thickening and roughening of the edge(s) being achieved in one operation.

2. An apparatus according to claim 1, characterized in that the pattern wheel is preferably driven by a frictional wheel which on its part is driven by the web so that no relative movement occurs between the pattern wheel and the web.

3. An apparatus according to any one of claims 1 or 11, characterized in that a smooth or profiled rotating sonotrode is used.

4. An apparatus according to claim 1, characterized in that the web has an upper and under side, and the pattern wheel has at least one encircling ridge to produce at least one valley and two arches on the upper side of the web and at least one arch on the underside.

5. An apparatus according to claim 1, characterized in that the pattern wheel has inserted conical pins to produce round craters having a fixed raised rim on the upper side of the web and conical elevations produced on the underside.

6. An apparatus according to claim 1, characterized in that the pattern wheel has polygonal pyramids on its surface to produce polygonal craters having a fixed raised rim on the upper face of the web and polygonal elevations produced on the under side.

7. An apparatus according to claim 1, characterized in that a calibration apparatus is arranged downstream of the stamping unit in order to deform and to fasten the thickenings produced by the pattern wheel of the stamping unit.

* * * * *